United States Patent
Luo

(10) Patent No.: US 9,665,277 B2
(45) Date of Patent: May 30, 2017

(54) METHOD FOR IMPLEMENTING CONTROL OF KEYS OF VIRTUAL KEYBOARD ON WIDE TOUCH SCREEN WITH TWO THUMBS

(71) Applicant: Mengming Luo, Jiangxi (CN)

(72) Inventor: Mengming Luo, Jiangxi (CN)

(73) Assignee: SHENZHEN HSMC TECHNOLOGY CO., LTD., Shenzhen (CN)

( * ) Notice: Subject to any disclaimer, the term of this patent is extended or adjusted under 35 U.S.C. 154(b) by 50 days.

(21) Appl. No.: 14/857,841

(22) Filed: Sep. 18, 2015

(65) Prior Publication Data

US 2016/0004435 A1    Jan. 7, 2016

Related U.S. Application Data

(63) Continuation of application No. PCT/CN2014/085912, filed on Sep. 4, 2014.

(30) Foreign Application Priority Data

Sep. 29, 2013 (CN) .......................... 2013 1 0466838
Nov. 14, 2013 (CN) .......................... 2013 1 0565660

(51) Int. Cl.
*G06F 3/0488* (2013.01)
*G06F 3/023* (2006.01)
*G06F 3/041* (2006.01)
*G06F 3/0489* (2013.01)

(52) U.S. Cl.
CPC ........ *G06F 3/04886* (2013.01); *G06F 3/0233* (2013.01); *G06F 3/0416* (2013.01); *G06F 3/04897* (2013.01); *G06F 2203/04808* (2013.01)

(58) Field of Classification Search
CPC .. G06F 3/04886; G06F 3/0416; G06F 3/0488; G06F 3/04842; G06F 3/0216; G06F 3/04897

See application file for complete search history.

(56) References Cited

U.S. PATENT DOCUMENTS

| | | | |
|---|---|---|---|
| 2008/0284744 A1* | 11/2008 | Park ................... | G06F 3/04886 345/173 |
| 2010/0156808 A1* | 6/2010 | Stallings ............. | G06F 3/04886 345/173 |
| 2011/0254865 A1* | 10/2011 | Yee ........................ | G06F 3/013 345/661 |
| 2012/0075194 A1* | 3/2012 | Ferren ................ | G02B 13/0065 345/168 |

(Continued)

*Primary Examiner* — Amy Ng
*Assistant Examiner* — Sang H Kim

(57) ABSTRACT

The present invention discloses a method for implementing control of keys of a virtual keyboard on a touch screen with two thumbs including conventional technical processes of arranging keys on a preset virtual keyboard according to a key layout and setting, and displaying the preset virtual keyboard and the keys on the touch screen according to the key arrangement of the preset virtual keyboard and corresponding setting and parameters. In this way, without changing the key layout of the preset virtual keyboard, the key position setting, and the current width of the virtual keyboard determined according to the current screen width, when the preset virtual keyboard is displayed and runs on the wide touch screen, the keys are at positions touchable by both thumbs of an operator.

7 Claims, 1 Drawing Sheet

(56) References Cited

U.S. PATENT DOCUMENTS

| | | | |
|---|---|---|---|
| 2012/0113007 A1* | 5/2012 | Koch | G06F 3/0488 |
| | | | 345/168 |
| 2012/0206363 A1 | 8/2012 | Kyprianou et al. | |
| 2012/0240069 A1* | 9/2012 | Kawalkar | G06F 3/04886 |
| | | | 715/767 |
| 2013/0174079 A1* | 7/2013 | Morley | G06F 3/04886 |
| | | | 715/773 |
| 2013/0222247 A1* | 8/2013 | Liu | G06F 3/04886 |
| | | | 345/168 |

* cited by examiner

METHOD FOR IMPLEMENTING CONTROL OF KEYS OF VIRTUAL KEYBOARD ON WIDE TOUCH SCREEN WITH TWO THUMBS

CROSS REFERENCE TO RELATED APPLICATIONS

The present application is a Continuation Application of PCT application No. PCT/CN2014/085912 filed on Sep. 4, 2014, which claims the benefits of Chinese Patent Application No. 201310466838.5 filed on Sep. 29, 2013 and Chinese Patent Application No. 201310565660.X filed on Nov. 14, 2013, the contents of which are hereby incorporated by reference.

TECHNICAL FIELD

The present invention relates to a method for producing a virtual keyboard on a touch screen of a mobile phone or a tablet computer having a wide touch screen, and a computer program product using the method, and particularly relates to a method for implementing control of keys of a virtual keyboard on a wide touch screen with two thumbs and a computer program product using the method.

BACKGROUND

Generally speaking, a virtual keyboard is as wide as a touch screen. If the touch screen/virtual keyboard is too wide and a large number of keys are arranged on the same row, an operator cannot touch or control the keys with both thumbs (the left/right thumb cannot touch or control the keys at the middle of the virtual keyboard). In view of the problem that the touch screen/virtual keyboard is too wide and the operator cannot control the keys for inputting with both thumbs, the existing technical solution is to split the virtual keyboard and the keys thereon into two independent keyboards (i.e. half of keyboard on the left and half of the keyboard on the right) and display the two keyboards on the left and right sides of the touch screen. Although this can satisfy the requirement of the operator of controlling the keys with both thumbs, negative issues caused by splitting the keyboard apparently exist. For example, two keyboards are required for input, and the man-machine interface is poor. Also, the change of the original key layout and the relative positions of the keys would affect the operability of the keyboard.

SUMMARY

The purpose of the present invention is to overcome the defects of the prior art and provide a method capable of respectively locating keys at touchable positions of left and right thumbs of an operator when a computer program displays and operates a preset virtual keyboard on a wide touch screen, on the premise of not changing the key layout, the key position setting of the preset virtual keyboard, and the width of the current virtual keyboard determined according to the current screen width.

The technical problem in the present invention is solved by the following technical solutions. This method for implementing control of keys of a virtual keyboard on a wide touch screen with two thumbs includes conventional technical processes of arranging keys on a preset virtual keyboard with at least three rows of keys, each row having more than five keys according to a conventional key layout and a corresponding setting; and displaying the preset virtual keyboard and keys thereon on a touch screen by a computer program according to the key layout, the corresponding setting and a parameter of the preset virtual keyboard. The conventional technical processes include a common technical process of determining a width of the preset virtual keyboard on a current touch screen, namely a width of the current virtual keyboard according to a current screen width, and further include a common technical process of calculating preset widths of corresponding keys and preset widths of blank areas on the current virtual keyboard according to the width of the current virtual keyboard and the percentages of the preset widths of the keys thereon and the preset widths of the blank areas in the virtual keyboard width.

The method for implementing control of keys of a virtual keyboard on a wide touch screen with two thumbs is characterized in that:

on the premise of not changing the key layout, a key position setting of the preset virtual keyboard, and the width of the current virtual keyboard determined according to the current screen width, when the preset virtual keyboard is displayed and runs on a wide touch screen, the keys thereon can be respectively located at positions touchable by the left and right thumbs of an operator, namely:

1. keys arranged on a center line of the current virtual keyboard are set to increase their key widths according to a width value marked by a specific parameter based on the preset widths thereof, and keys arranged on the left and right sides of the center line of the current virtual keyboard are set to increase their key widths according to half of the width value marked by the specific parameter based on the preset widths thereof, or the keys arranged on the center line of the current virtual keyboard are set to increase their key widths according to twice of the width value marked by the specific parameter based on the preset widths thereof, and the keys arranged on the left and right sides of the center line of the current virtual keyboard are set to increase their key widths according to the width value marked by the specific parameter based on the preset widths thereof;

the specific parameter is a width parameter value which can be used for directly or indirectly marking an identical width measuring unit of the virtual keyboard, or the specific parameter is modified by the operator, an initial value of the specific parameter can be set as a minimum value "0", the width value marked by the minimum value "0" of the specific parameter is "0", and a maximum width value marked by a maximum value of the specific parameter can be a width value obtained by subtracting a virtual keyboard width at least necessary for displaying the keys thereon from an actual width of the current virtual keyboard;

the keys arranged on the left and right sides of the center line of the virtual keyboard refer to a key closest to the left side of the center line of the virtual keyboard and a key closest to the right side of the center line of the virtual keyboard in the same row of keys;

2. when the computer program calculates the preset widths of corresponding keys and the preset widths of the blank areas in the current virtual keyboard according to the width of the current virtual keyboard and the percentages of the preset widths of the keys thereon and the preset widths of the blank areas in the virtual keyboard width, the adopted width value of the current virtual keyboard is set to subtract the width value to be added on a single key among the keys arranged on the center line of the virtual keyboard, or is set to subtract twice the width value to be added on the single key among the keys arranged on the left and right sides of the center line of the virtual keyboard, namely when the computer program calculates the preset widths of corresponding keys and the preset widths of the blank areas in the current virtual keyboard according to the width of the current virtual keyboard and the percentages of the preset widths of the keys therein and the preset widths of the blank areas in the virtual keyboard width, the adopted width value of the virtual keyboard is a width value obtained by subtracting the width value to be added on the single key among the keys arranged on the center line of the virtual keyboard from the width value of the current virtual keyboard, or a width value obtained by subtracting twice of the width value to be added on the single key among the keys arranged on the left and right sides of the center line of the virtual keyboard from the width value of the current virtual keyboard;

3. the arranging of the keys according to the conventional key layout and the corresponding setting includes:

the distance from the left end sidelines of the keys arranged on the center line of the virtual keyboard to the center line of the virtual keyboard is basically equal to the distance from the right end sidelines of the keys to the center line of the virtual keyboard;

the distance from the left end sidelines of the keys arranged on the left side of the center line of the virtual keyboard to the center line of the virtual keyboard is basically equal to the distance from the right end sidelines of the keys arranged on the right side of the center line of the virtual keyboard in the same row of keys to the center line of the virtual keyboard.

The technical problem in the present invention is solved by the following further technical solutions. If the current virtual keyboard displayed on the touch screen is too wide and both thumbs cannot touch the keys, the operator can modify the specific parameter by touching a corresponding key to respectively locate the keys in the current virtual keyboard at positions touchable by the left and right thumbs of the operator.

Compared with the prior art, the present invention has the advantages and effects that, on the premise of not changing the key layout, the key position setting of the preset virtual keyboard, and the width of the current virtual keyboard determined according to the current screen width, when the preset virtual keyboard is displayed and runs on the wide touch screen, the keys therein can be respectively located at touchable positions of left and right thumbs of the operator. No matter how wide the current touch screen is, the operator can modify the specific parameter by touching the corresponding key to touch all keys in the virtual keyboard by both thumbs. The present invention can be widely applied to wide touch screens of mobile phones and tablet computers.

DETAILED DESCRIPTION OF THE EMBODIMENTS

A further illustration of the present invention will be given below in combination with specific embodiments.

Embodiment 1

Figure 1:
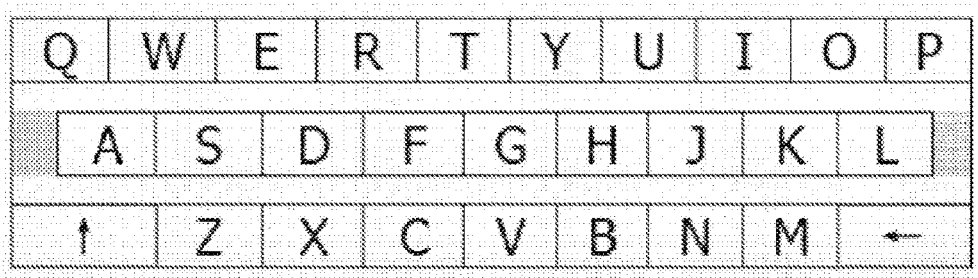
FIG. 1 is a diagram of a virtual keyboard displayed on a touch screen according to specific embodiment 1 when "specific parameter" is "0".

The specific embodiment is based on a preset virtual keyboard as shown in FIG. 1, which is provided with 26 letter keys and 2 function keys, wherein the percentage of a preset width of each letter key in the virtual keyboard width is set at 10%, the percentage of the a preset width of each function key in the virtual keyboard width is set at 15%, and the percentage of a preset width of a blank area on the left side of the letter A key and the percentage of a preset width of a blank area on the right side of the letter L key in the virtual keyboard width are set at 5%.

The letter T key and the letter Y key on the first row of the keys are keys arranged on the left and right sides of the center line of the virtual keyboard, and the distance from the left end sideline of the letter T key to the center line of the virtual keyboard is basically equal to the distance from the right end sideline of the letter Y key to the center line of the virtual keyboard.

The letter G key on the second row of the keys is a key arranged on the center line of the virtual keyboard, and the distance from the left end sideline of the letter G key to the center line of the virtual keyboard is basically equal to the distance from the right end sideline thereof to the center line of the virtual keyboard.

The letter V key on the third row of the keys is a key arranged on the center line of the virtual keyboard, and the distance from the left end sideline of the letter V key to the center line of the virtual keyboard is basically equal to the distance from the right end sideline thereof to the center line of the virtual keyboard.

In the specific embodiment, the virtual keyboard width at least necessary for displaying the keys is set at "400" points. The keys arranged on the center line of the current virtual keyboard are set to increase their key widths according to a width value marked by a specific parameter based on the preset widths thereof, and the keys arranged on the left and right sides of the center line of the current virtual keyboard are set to increase their key widths according to half of the width value marked by the specific parameter based on the preset widths thereof.

For example, the current screen width/virtual keyboard width is "720" points, the initial value/minimum value of the specific parameter is "0", and the width value marked by the specific parameter is "0" point. Then, the letter G key and the letter V key arranged on the center line of the current virtual keyboard are added with the width of "0" point based on the preset widths thereof; and the letter T key and the letter Y key arranged on the left and right sides of the center line of the virtual keyboard are added with the width of "0" point based on the preset widths thereof.

When calculating the preset widths of corresponding keys and blank areas in the current virtual keyboard according to the width of the current virtual keyboard and the percentages of the preset widths of the keys and the blank areas thereon in the virtual keyboard width, the width value "0" to be added on a single key among the keys arranged on the center line of the virtual keyboard is subtracted from the adopted width value "720" of the current virtual keyboard, or twice of the width value "0" to be added on the single key among the keys arranged on the left and right sides of the center line of the virtual keyboard is subtracted.

That means the computer program calculates the preset widths of each key and each blank area in the current virtual keyboard according to the width value, namely "720" points, of the current virtual keyboard and the percentages of the preset widths of each key and each blank area in the virtual keyboard width. The result is that in the width of the current virtual keyboard, the preset width of each letter key is "72" points, the preset width of each function key is "108" points, and the preset width of the blank area on the left side of the letter A key and the preset width of the blank area on the right side of the letter L key are "36" points.

Based on the preset widths of the keys, after the width of "0" point is respectively added to the letter G key and the letter V key arranged on the center line of the current virtual keyboard, the widths thereof are still "72" points; and after the width of "0" point is respectively added to the letter T key and the letter Y key arranged on the left and right sides of the center line of the virtual keyboard, the widths thereof are still "72" points.

As described above, the current virtual keyboard displayed on the touch screen is as shown in FIG. 1. Apparently, the operator cannot touch or control the keys arranged at the middle of the virtual keyboard when using both thumbs to touch the keys. The operator modifies the specific parameter by touching a corresponding key to respectively locate the keys in the current virtual keyboard at touchable positions of left and right thumbs.

For example, the current screen width/virtual keyboard width is "720" points. The operator modifies the specific parameter to "200" points, and then the width value marked by the specific parameter is "200" points. That is to say the letter G key and the letter V key arranged on the center line of the current virtual keyboard are added with the width of "200" points based on the preset widths thereof; and the letter T key and the letter Y key arranged on the left and right sides of the center line of the virtual keyboard are added with the width of "100" points based on the preset widths thereof.

When calculating the preset widths of corresponding keys and blank areas on the current virtual keyboard according to the width of the current virtual keyboard and the percentages of the preset widths of the keys and the blank areas therein in the virtual keyboard width, the width value "200" to be added on a single key among the keys arranged on the center line of the virtual keyboard is subtracted from the adopted width value "720" of the current virtual keyboard, or twice of the width value "100" to be added on the single key among the keys arranged on the left and right sides of the center line of the virtual keyboard is subtracted.

That means the computer program calculates the preset widths of each key and each blank area in the current virtual keyboard according to the width value, namely "520" points, of the current virtual keyboard and the percentages of the preset width of each key and each blank area in the virtual keyboard width. The result is that in the width of the current virtual keyboard, the preset width of each of the 26 letter keys is "52" points, the preset width of each function key is "78" points, and the preset width of the blank area on the left side of the letter A key and the present width of the blank area on the right side of the letter L key are "26" points.

Based on the preset widths of the keys, after the width of "200" points is respectively added to the letter G key and the letter V key arranged on the center line of the current virtual keyboard, the widths thereof are changed to "252" points; and after the width of "100" points is respectively added to the letter T key and the letter Y key arranged on the left and right sides of the center line of the virtual keyboard, the widths thereof are respectively changed to "152" points.

Figure 2:
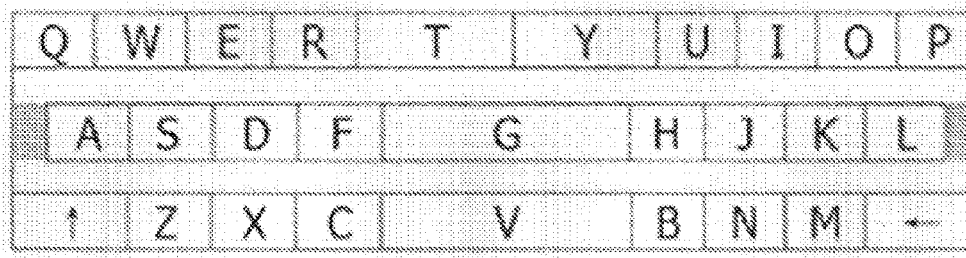
FIG. 2 is a diagram of a virtual keyboard displayed on a touch screen according to specific embodiment 1 when "specific parameter" is "200".

As described above, the current virtual keyboard displayed on the touch screen is as shown in FIG. 2. Apparently, the operator can control the keys arranged at the middle of the virtual keyboard when using both thumbs to touch the keys.

Embodiment 2

Figure 3:
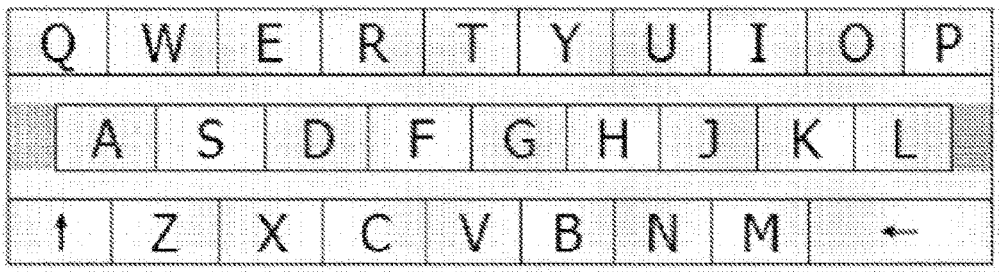
FIG. 3 is a diagram of a virtual keyboard displayed on a touch screen according to specific embodiment 2 when "specific parameter" is "0".

The specific embodiment is based on a preset virtual keyboard as shown in FIG. 3, which is provided with 26 letter keys and 2 function keys, wherein the percentage of a preset width of each letter key in the virtual keyboard width is set at 10%, the percentage of the preset width of the first function key on the left side of the third row in the virtual keyboard width is set at 10%, the percentage of the preset width of the last function key in the third row in the virtual keyboard width is set at 20%, and the percentage of the preset width of a blank area on the left side of the letter A key and the percentage of the preset width of the blank area on the right side of the letter L key in the virtual keyboard width are set at 5%.

The letter T key and the letter Y key on the first row of the keys are keys respectively arranged on the left and right sides of the center line of the virtual keyboard, and the distance from the left end sideline of the letter T key to the center line of the virtual keyboard is basically equal to the distance from the right end sideline of the letter Y key to the center line of the virtual keyboard.

The letter G key on the second row of the keys is a key arranged on the center line of the virtual keyboard, and the distance from the left end sideline of the letter G key to the center line of the virtual keyboard is basically equal to the distance from the right end sideline thereof to the center line of the virtual keyboard.

The letter V key and the letter B key on the third row of the keys are keys arranged on the left and right sides of the center line of the virtual keyboard, and the distance from the left end sideline of the letter V key to the center line of the virtual keyboard is basically equal to the distance from the right end sideline of the letter B key to the center line of the virtual keyboard.

In the specific embodiment, the virtual keyboard width at least necessary for displaying the keys is set at "400" points. The keys arranged on the center line of the current virtual keyboard are set to increase their key widths according to twice of a width value marked by a specific parameter based on the preset widths thereof, and the keys which are respectively arranged on the left and right sides of the center line of the current virtual keyboard are set to increase their key widths according to the width value marked by the specific parameter based on the preset widths thereof.

For example, the current screen width/virtual keyboard width is "720" points, the initial value/minimum value of the specific parameter is "0", and the width value marked by the specific parameter is "0" point. Then, the letter G key arranged on the center line of the current virtual keyboard is added with the width of "0" point based on the preset width thereof; the letter T, Y keys and the letter V, B keys arranged on the left and right sides of the center line of the virtual keyboard are added with the width of "0" point based on the preset widths thereof.

When calculating the preset widths of corresponding keys and blank areas in the current virtual keyboard according to the width of the current virtual keyboard and the percentages of the preset widths of the keys and the blank areas therein in the virtual keyboard width, the width value "0" to be added on a single key among the keys arranged on the center line of the virtual keyboard is subtracted from the adopted width value "720" of the current virtual keyboard, or twice of the width value "0" to be added on the single key among the keys arranged on the left and right sides of the center line of the virtual keyboard is subtracted.

That is to say the computer program calculates the preset widths of each key and each blank area in the current virtual keyboard according to the width value, namely "720" points, of the current virtual keyboard and the percentages of the preset widths of each key and each blank area in the virtual keyboard width. The result is that in the width of the current virtual keyboard, the preset width of each letter key is "72" points, the preset width of the first function key on the left side of the third row is "72" points, the preset width of the last function key on the right side of the third row is "144" points, and the preset width of the blank area on the left side of the letter A key and the preset width of the blank area on the right side of the letter L key are "36" points.

Based on the preset widths of the keys, after the width of "0" point is added to the letter G key arranged on the center line of the current virtual keyboard, the width thereof is still "72" points; and after the width of "0" point is respectively added to the letter T, Y keys and letter V, B keys arranged on the left and right sides of the center line of the virtual keyboard, the widths thereof are still "72" points.

As described above, the current virtual keyboard displayed on the touch screen is as shown in FIG. 3. Apparently, the operator cannot control the keys arranged at the middle of the virtual keyboard when using both thumbs to touch the keys. The operator modifies the specific parameter by touching a corresponding key to respectively locate the keys in the current virtual keyboard at touchable positions of left and right thumbs.

For example, the current screen width/virtual keyboard width is "720" points. The operator modifies the specific parameter into "100" points, and then the width value marked by the specific parameter is "100" points. That is to say the letter G key arranged on the center line of the current virtual keyboard is added with the width of "200" points based on the preset width thereof; and the letter T, Y keys and the letter V, B keys arranged on the left and right sides of the center line of the virtual keyboard are added with the width of "100" points based on the preset widths thereof.

When calculating the preset widths of corresponding keys and blank areas on the current virtual keyboard according to the width of the current virtual keyboard and the percentages of the preset widths of the keys and the blank areas therein in the virtual keyboard width, the width value "200" to be added on a single key among the keys arranged on the center line of the virtual keyboard is subtracted from the adopted width value "720" of the current virtual keyboard, or twice of the width value "100" to be added on the single key among the keys arranged on the left and right sides of the center line of the virtual keyboard is subtracted.

That means the computer program calculates the preset widths of each key and each blank area in the current virtual keyboard according to the width value, namely "520" points, of the current virtual keyboard and the percentage of the preset width of each key and each blank area in the virtual keyboard width. The result is that in the width of the current virtual keyboard, the preset widths of the 26 letter keys are "52" points, the preset width of the first function key on the left side of the third row is "52" points, the preset width of the last function key on the right side of the third row is "104" points, and the preset width of the blank area on the left side of the letter A key and the preset width of the blank area on the right side of the letter L key are "26" points.

Based on the preset widths of the keys, after the width of "200" points is added to the letter G key arranged on the center line of the current virtual keyboard, the width thereof is changed to "252" points. After the width of "100" points is respectively added to the letter T, Y keys and the letter V, B keys arranged on the left and right sides of the center line of the virtual keyboard, the widths thereof are changed to "152" points.

Figure 4:
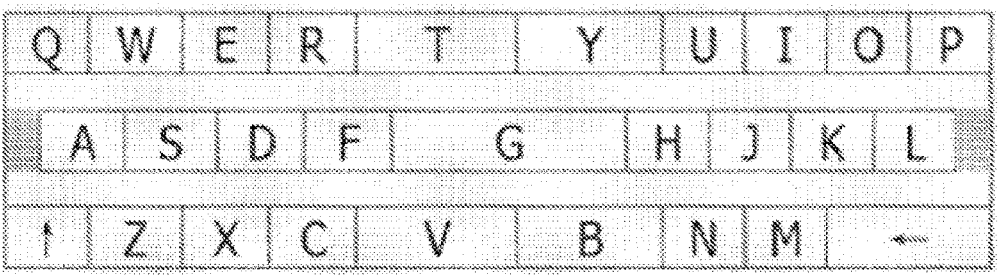
FIG. 4 is a diagram of a virtual keyboard displayed on a touch screen according to specific embodiment 2 when "specific parameter" is "100".

As described above, the current virtual keyboard displayed on the touch screen is as shown in FIG. 4. Apparently, the operator can control the keys arranged at the middle of the virtual keyboard when using both thumbs to touch the keys.

The above contents are further detailed description of the present invention in combination with the specific embodiments. However, it cannot be held that the specific embodiments of the present invention are only limited to the description. Those of ordinary skill in the art to which the present invention pertains can still make a variety of simple modifications or substitutions on the premise of not deviating from the conception of the present invention, and these modification or substitutions should be deemed to be within the scope of patent protection determined by the proposed claims of the present invention.

What is claimed is:

1. A method for implementing control of keys of a virtual keyboard on a wide touch screen, the wide touch screen having a middle position which is untouchable by a left thumb and a right thumb of an operator when held by two hands of the operator, the method comprising the steps of:
  (a) arranging keys on a preset virtual keyboard with at least three rows of keys, each row having more than five keys according to a conventional key layout and a corresponding setting; and determining width percentages of each key and each blank area among each row on the preset virtual keyboard;
  (b) determining a width of the preset virtual keyboard on a current screen of the wide touch screen according to a width of the current screen to obtain a width of a current virtual keyboard;
  (c) calculating widths of each key and each blank area among each row on the current virtual keyboard according to the width of the current virtual keyboard and the width percentages of each key and each blank area among each row; if a center line of the current virtual keyboard perpendicular to the rows of keys passes through a middle key among each row on the current virtual keyboard, increasing a width of the middle key and correspondingly adjusting widths of remaining keys among each row of keys on the current virtual keyboard; and
  (d) displaying an adjusted virtual keyboard on the current screen, each key of the adjusted virtual keyboard being touchable by the left thumb or the right thumb when held by the two hands of the operator; wherein the steps of increasing the width of the middle key among each row on the current virtual keyboard and correspondingly adjusting widths of remaining keys among each row of keys on the current virtual keyboard comprise:
  determining the width of the middle key to be increased;
  determining a remaining width of the current virtual keyboard, the remaining width being a difference between the width of the current virtual keyboard and the width of the middle key to be increased;

calculating the widths of each key and each blank area among each row on the current virtual keyboard according to the remaining width of the current virtual keyboard and the width percentages of each key and each blank area among each row; and increasing the width of the middle key according to the width of the middle key to be increased.

2. The method as claimed in claim 1, wherein a distance from a left sidewall of the middle key to the center line is equal to a distance from a right sidewall of the middle key to the center line.

3. The method as claimed in claim 1, wherein an increased width of the middle key is adjustable.

4. A method for implementing control of keys of a virtual keyboard on a wide touch screen, the wide touch screen having a middle position which is untouchable by a left thumb and a right thumb of an operator when held by two hands of the operator, the method comprising the steps of:

(a) arranging keys on a preset virtual keyboard with at least three rows of keys, each row having more than five keys according to a conventional key layout and a corresponding setting; and determining width percentages of each key and each blank area among each row on the preset virtual keyboard;

(b) determining a width of the preset virtual keyboard on a current screen of the wide touch screen according to a width of the current screen to obtain a width of a current virtual keyboard;

(c) calculating widths of each key and each blank area among each row on the current virtual keyboard according to the width of the current virtual keyboard and the width percentages of each key and each blank area among each row; if a center line of the current virtual keyboard perpendicular to the rows of keys locates between a left middle key and a right middle key, increasing widths of the left and right middle keys and correspondingly adjusting widths of remaining keys among each row of keys on the current virtual keyboard; and (d) displaying an adjusted virtual keyboard on the current screen, each key of the adjusted virtual keyboard being touchable by the left thumb or the right thumb when held by the two hands of the operator;

wherein the steps of increasing widths of the left and right middle keys among each row on the current virtual keyboard and correspondingly adjusting widths of remaining keys among each row of keys on the current virtual keyboard comprise:

determining a width of the left middle key to be increased and a width of the right middle key to be increased, and determining a sum of the width of the left middle key to be increased and the width of the right middle key to be increased;

determining a remaining width of the current virtual keyboard, the remaining width being a difference between the width of the current virtual keyboard and the sum of the width of the left middle key to be increased and the width of the right middle key to be increased;

calculating the widths of each key and each blank area among each row on the current virtual keyboard according to the remaining width of the current virtual keyboard and the width percentages of each key and each blank area among each row; and respectively increasing the widths of the left middle key and the right middle key according to the width of the left middle key to be increased and the width of the right middle key to be increased.

5. The method as claimed in claim 4, wherein a distance from a left sidewall of the left middle key to the center line is equal to a distance from a right sidewall of the right middle key to the center line.

6. The method as claimed in claim 4, wherein increased widths of the left and right middle keys are adjustable.

7. The method as claimed in claim 4, wherein the width of the left middle key to be increased is equal to the width of the right middle key to be increased.

* * * * *